(12) United States Patent
Suzuki et al.

(45) Date of Patent: Jul. 15, 2014

(10) Patent No.: US 8,777,296 B2

(54) STEP UNIT

(75) Inventors: Seiichi Suzuki, Miyoshi (JP); Tsutomu Takeuchi, Gamagori (JP); Toshihiko Ishida, Niwa-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/982,058

(22) PCT Filed: Aug. 10, 2011

(86) PCT No.: PCT/JP2011/004516
§ 371 (c)(1),
(2), (4) Date: Jul. 26, 2013

(87) PCT Pub. No.: WO2012/114394
PCT Pub. Date: Aug. 30, 2012

(65) Prior Publication Data
US 2013/0307291 A1    Nov. 21, 2013

(30) Foreign Application Priority Data

Feb. 22, 2011    (JP) .................. 2011-035863

(51) Int. Cl.
*B60R 3/02*    (2006.01)
*B60R 3/00*    (2006.01)
*B60J 5/06*    (2006.01)
*E05F 15/14*    (2006.01)

(52) U.S. Cl.
CPC . *B60R 3/002* (2013.01); *B60J 5/06* (2013.01); *E05F 15/14* (2013.01)
USPC .......................................... 296/155; 280/163

(58) Field of Classification Search
CPC ............... B60J 1/16; B60J 5/049; B60J 5/06; B60R 3/002; E05F 1/16; E05F 15/06; E05F 15/14
USPC ....... 296/146.1, 155; 16/87 R, 96 R, 97, 102, 16/106; 280/163, 164.1
See application file for complete search history.

(56) References Cited

U.S. PATENT DOCUMENTS 4,981,321 A      1/1991    Watanabe et al.
5,992,097 A *  11/1999   Makiuchi et al. ................ 49/216
(Continued)

FOREIGN PATENT DOCUMENTS

DE    3613284 A1 * 10/1987 .................. B60J 5/06
EP    0 356 373 A1    2/1990
(Continued)

OTHER PUBLICATIONS

International Search Report (PCT/ISA/210) issued on Dec. 6, 2011, by the Japanese Patent Office as the International Searching Authority for International Application No. PCT/JP2011/004516.

(Continued)

*Primary Examiner* — Glenn Dayoan
*Assistant Examiner* — Paul Chenevert
(74) *Attorney, Agent, or Firm* — Buchanan Ingersoll & Rooney (57) ABSTRACT

A step unit that guides a sliding door of a vehicle includes a step member and a rail plate member. The step member includes first and second lower rails. The first lower rail has two ends that face toward each other to form a cutout portion in between. The rail plate member is arranged in the cutout portion. The step member includes an insertion hole and an extended portion. The insertion hole is located at a position corresponding to the cutout portion. The extended portion is extended from at least one of the two ends to support the rail plate member against a load received by the rail plate member from the roller. The rail plate member is inserted through the insertion hole from above the upper side of the step member and fixed by a fastening member to the step member.

10 Claims, 6 Drawing Sheets

(56) References Cited

U.S. PATENT DOCUMENTS

| | | | |
|---|---|---|---|
| 7,243,978 B2 * | 7/2007 | Mather et al. | 296/155 |
| 7,354,100 B2 * | 4/2008 | Yokomori et al. | 296/155 |
| 7,621,586 B2 * | 11/2009 | Fischer et al. | 296/155 |
| 7,997,639 B2 * | 8/2011 | Yokomori et al. | 296/155 |
| 8,413,379 B2 * | 4/2013 | Ishida et al. | 49/216 |
| 2009/0309325 A1 | 12/2009 | Okada et al. | |

FOREIGN PATENT DOCUMENTS

| | | | | |
|---|---|---|---|---|
| EP | 2 080 669 A1 | | 7/2009 | |
| FR | 2567951 A1 * | 1/1986 | | B60J 5/06 |
| JP | 57022912 A * | 2/1982 | | B60J 5/06 |
| JP | 59034924 A * | 2/1984 | | B60J 5/06 |
| JP | 02068219 A * | 3/1990 | | B60J 5/06 |
| JP | 05065025 A * | 3/1993 | | B60J 5/06 |
| JP | 05065026 A * | 3/1993 | | B60J 5/06 |

OTHER PUBLICATIONS

Written Opinion (PCT/ISA/237) issued on Dec. 6, 2011, by the Japanese Patent Office as the International Searching Authority for International Application No. PCT/JP2011/004516.

Toyota Alphard Vellfire Repair Manual vol. F, May 2008 (DH-282 to DH-285, DH-246, DH-247 etc.), 10 pages.

* cited by examiner

STEP UNIT

TECHNICAL FIELD

The present invention relates to a step unit including a step member arranged adjacent to a sliding door of a vehicle.

BACKGROUND ART

A step unit is arranged adjacent to a sliding door in a vehicle body. For example, with reference to NPL 1, the step unit includes a step member and a rail plate member. A lower rail extends in the direction in which a sliding door opens and closes on a lower surface of the step member. The lower rail supports rollers coupled to the sliding door. Thus, the rollers and the sliding door are guided along the lower rail. A cutout portion is formed in part of the lower rail. The rail plate member is coupled to the lower rail in a removable manner at the cutout portion. When the rail plate member is removed from the lower rail, the rollers may be supported by the lower rail or be removed from the lower rail through the cutout portion.

CITATION LIST

Non Patent Literature

[NPL 1]
TOYOTA ALPHARD VELLFIRE Repair Manual Volume F, May, 2008 (DH-282 to DH-285, DH-246, DH-247 etc.)

SUMMARY OF INVENTION

Technical Problem

In the step unit described above, the step member and a bent fastening piece, which is formed on the rail plate member, each include a fastening hole. A bolt is inserted through the two fastening holes to couple the step member and rail plate member. However, one must grope below the step member to move the rail plate member and align the two fastening holes. Thus, it is difficult to couple the step member and rail plate member.

Further, in the step unit described above, the load applied by the rollers to the rail plate member is large, and the rigidity of the lower rail is low around the cutout portion. This has resulted in the rail plate member having a complicated structure. In detail, the rail plate member is generally formed by welding and joining two metal plates. One of the metal plates bulges outward to be flush with the inner surface of the lower rail. Additionally, the rail plate member includes a structure for reinforcing two opposing ends of the lower rail that form the cutout portion. Accordingly, the rail plate member has a complicated structure.

It is an object of the present invention to provide a step unit in which the assembly work is easy and the rail plate member has a simple shape.

Solution to Problem

To achieve the above object, one aspect of the present invention provides a step unit that guides a sliding door of a vehicle along a direction in which the sliding door opens and closes. The step unit includes a step member and a rail plate member. The step member is formed from a resin material arranged in a vehicle body adjacent to the sliding door. The step member includes a lower surface and first and second lower rails, which are arranged on the lower surface and extend along the direction in which the sliding door opens and closes. The first and second lower rails hold and guide a roller therebetween. The roller is coupled to the sliding door. The first lower rail includes two ends facing toward each other to form a cutout portion between the two ends. The rail plate member is arranged in the cutout portion and continuously connects the first lower rail along the opening and closing direction. The step member includes an insertion hole and an extended portion. The insertion hole extends through the step member in a vertical direction of the vehicle body at a location corresponding to the cutout portion. The extended portion extends from at least one of the two ends to support the rail plate member against a load received by the rail plate member from the roller. The rail plate member is inserted through the insertion hole from above the step member and fixed by a fastening member to the step member.

According to this configuration, the step member includes the insertion hole, which extends through the step member in the vertical direction at a location corresponding to the cutout portion formed in part of the lower rail. The rail plate member is inserted through the insertion hole from the upper side of the step member and fixed by a fastening member to the step member. This facilitates the assembly work compared to the prior art. Further, the fastening member is used to fix the rail plate member. Thus, in comparison to when, for example, press-fitting and fixing a rail plate member to an insertion hole, the rail plate member and the insertion hole do not need to be manufactured with high accuracy. When press-fitting and fixing the rail plate member into the insertion hole, the rail plate member and insertion hole should be formed with high accuracy. Otherwise, dimension variations may result in the rail plate member being loose or a large force being necessary for the press-fitting. In contrast, the step unit of the present embodiment does not have such a drawback and is thus advantageous. Further, when press-fitting and fixing the rail plate member into the insertion hole, the rail plate member, which is press-fitted and fixed, may have to be removed, for example, to perform maintenance. In such a case, the desired press-fitting force may not be obtained when press-fitting the rail plate member again after the maintenance work is completed. This may result in the rail plate becoming loose in the insertion hole. In contrast, the step unit of the present embodiment does not have such a drawback and is thus advantageous. The step member includes the extended portions respectively extending from the two ends of the lower rail to support the rail plate member against load that is received by the rail plate member from the rollers. This prevents the rail plate member from being deformed by the load received from the roller. Further, the extended portions prevent a force corresponding to the load of the rollers from being applied to the fastening member. Thus, the fastening member does not require high strength. As a result, the fastening member does not have to be formed from a metal and may be a resin clip formed from a resin material like in the present embodiment. Moreover, the extended portions extend from the ends of the lower rail. This increases the rigidity of the ends. Thus, there is no need for the rail plate member to include a structure that reinforces the ends. Consequently, the rail plate member has a simple shape and may be formed from a single plate (metal plate) like in the present embodiment. Furthermore, when part of the rail plate member is bulged outward to be flush with the inner surface of the lower rail (surface that contacts rollers) as in the prior art, a corner of the bulged portion would be rounded and a step that affects the rollers would be easily formed between the end of the lower rail and the rail plate member. In contrast, the rail plate member of the present embodiment does not have to be molded to form such a bulging portion. This easily eliminates such a step and contributes to smooth movement of the roller and the sliding door. Further, a step member is generally formed processing a sheet metal of metal. However, the step member of the present embodiment is molded from a resin. This increases the degree of freedom in the shape of the step member, and the extended portions and the like can easily be molded integrally with the step member.

Preferably, the fastening member is formed from a resin material.

According to this structure, the fastening member is formed from a resin material. This lower costs and decreases weight compared to when using a metal bolt or the like that is formed from a metal material. For example, when a fastening member is formed from metal material, to avoid problems resulting from the difference in coefficient of thermal expansion, a metal member for engagement with the fastening member, must be insert molded in the step member. In contrast, the use of the fastening member, which is formed from a resin material, like in the present embodiment decreases the difference in the coefficient of thermal expansion when the fastening member is directly engaged with the step member, which is formed from a resin material. This eliminates the need for the metal member.

Preferably, the rail plate member includes a bent portion, which is arranged at an upper end of the plate member and extends in a direction orthogonal to the vertical direction of the vehicle body.

According to this structure, the rail plate member includes the bent portion, which is arranged at the upper end and extends in a direction orthogonal to the vertical direction. Thus, for example, the bent portion prevents the rail plate member from falling from the step member (insertion hole). Further, in a state in which the rail plate member is inserted in the insertion hole and the fastening member removed from the rail plate member, a jig can be used to lift the bent portion from its lower surface to easily remove the rail plate member.

Preferably, the fastening member is coupled to the step member from above to fasten the bent portion between the fastening member and an upper surface of the step member.

The fastening member is coupled from the upper side to fasten the bent portion between the fastening member and the step member. More specifically, the rail plate member is inserted through the insertion hole from above the step member. Then, the fastening structure is also coupled from above. Thus, the fastening member is quickly and easily coupled compared to when coupled from other directions.

Preferably, the bent portion extends toward an outer side of the vehicle in a lateral direction of the vehicle.

Preferably, the step member includes an engagement hole extending through the step member in the vertical direction of the vehicle body at a location corresponding to the cutout portion. The bent portion includes a fastening hole extending through the bent portion in the vertical direction of the vehicle body and aligned with the engagement hole when the rail plate member is coupled to the step member. The rail plate member is fixed to the step member by the fastening member fitted to the fastening hole and the engagement hole in a state in which the rail plate member is inserted into the insertion hole until a lower surface of the bent portion comes into contact with an upper surface of the step member.

Preferably, the bent portion includes a distal end from which a downward extending portion extends. The fastening member is coupled from an outer side of the vehicle to fasten the downward extending portion between the fastening member and a side surface of the step member facing outward relative to the vehicle.

According to this structure, the bent portion includes a distal end from which a downward extending portion extends. The fastening member is coupled from an outer side of the vehicle to fasten the downward extending portion between the fastening member and a side surface of the step member. The bent portion and the downward extending portion are hooked and prevent the rail plate member from falling out of the step member (or insertion hole). The fastening member is assembled from the outer side of the vehicle. This facilitates the coupling of the fastening member compared to when coupled from the lower side.

Preferably, the extended portion is one of two extended portions. The two extended portions respectively extend from the two ends in a direction in which a load is received by the rail plate member, and the two extended portions extend toward each other.

According to this structure, the extended portions extend from the corresponding ends along a direction in which the rail plate member receives a load from the rollers, and the two extended portions extend toward each other. In such a structure, the extended portions do not obstruct the arrangement of the rollers through the cutout portion between the two lower rails. In addition, the two opposite ends of the rail plate member are supported by the extended portions. This increases the rigidity of the rail plate member in the direction in which the rail plate member receives load (input) from the rollers compared to a structure in which only one of the two ends of the rail plate member is supported. Further, the rigidity increases at the two ends of the lower rail.

Preferably, the two extended portions are thicker than the first lower rail in the direction of the load.

According to this structure, the extended portions are thicker than the lower rail in the direction the rail plate member receives a load. This securely supports the rail plate member.

DESCRIPTION OF EMBODIMENTS

One embodiment of the present invention will now be described with reference to FIGS. 1 to 7.

Figure 1:
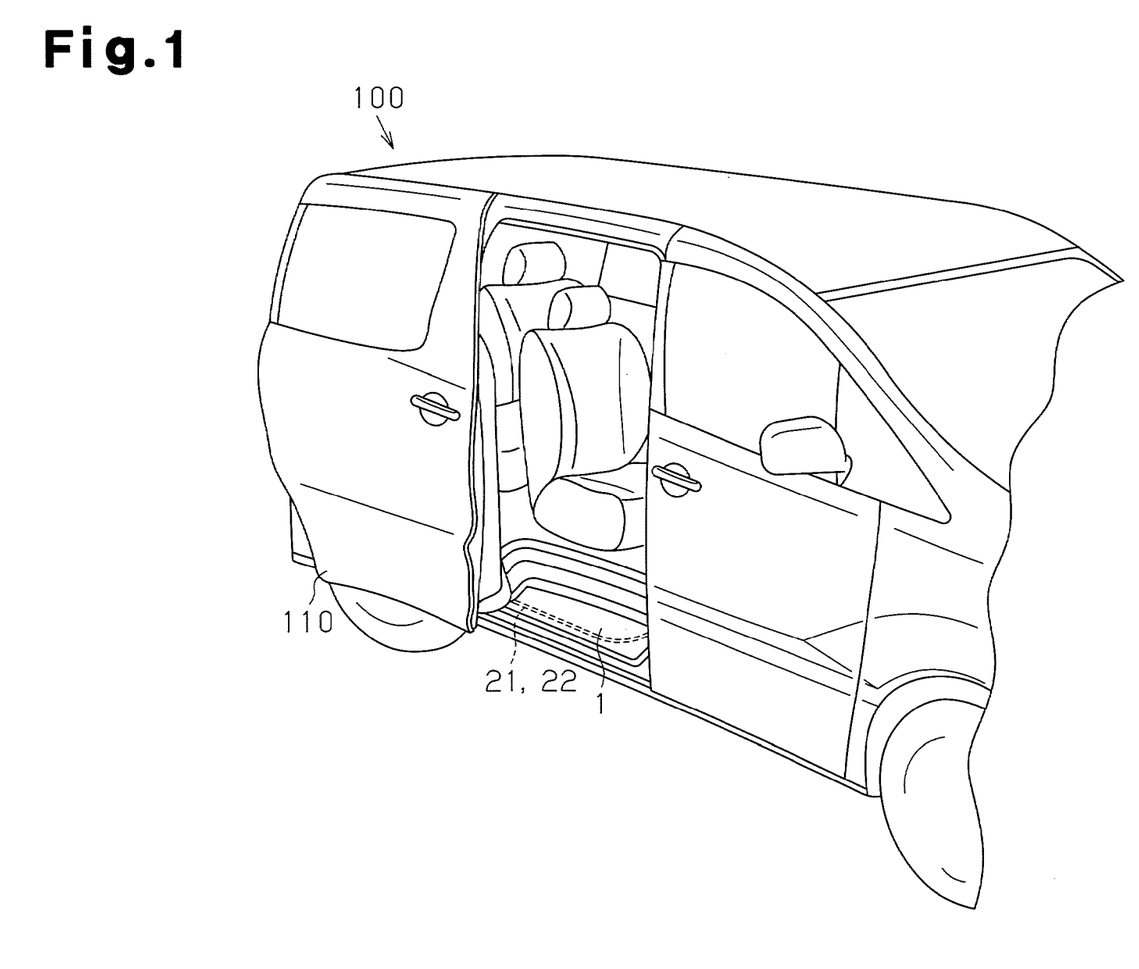
FIG. 1 is a schematic perspective view showing a vehicle including a step unit according to one embodiment of the present invention.

As shown in FIG. 1, a vehicle includes a step unit 1 that is adjacent to a sliding door 110. The step unit 1 is fixed to a vehicle body 100.

Figure 2:
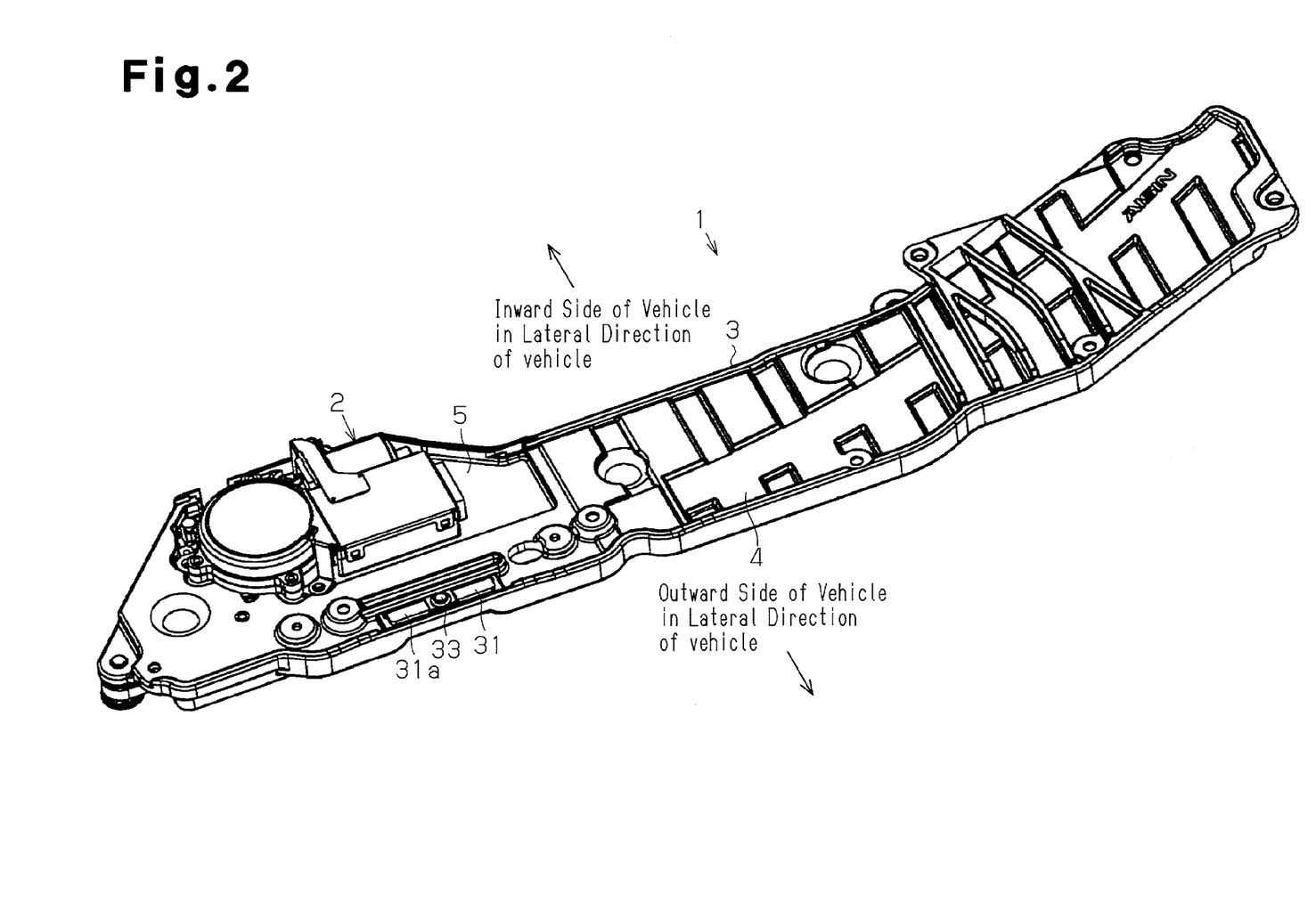
FIG. 2 is a perspective view showing the step unit of FIG. 1 from an upper side.

As shown in FIG. 2, the step unit 1 includes a drive device 2 (motor unit), which drives and opens or closes the sliding door 110, and a generally plate-shaped step member 3 (step-stool) 3. The drive device 2 and the step member 3 serve as the main components of the step unit 1. The step unit 1 includes an upper surface that is entirely covered by a thin scuff plate, or decorative member (not shown). The drive device 2 includes an upper surface that is covered by a rigid plate (cover) arranged below the scuff plate.

The step member 3 is molded from a resin material. The step member 3 is arranged in the vehicle at a location adjacent to the sliding door 110 when closed. The step member 3 includes a flat portion 4 and an accommodation portion 5. A vehicle passenger steps on the flat portion 4 when entering and exiting the vehicle. The accommodation portion 5 is located at an opening side of the sliding door 110, that is, near the end of the step member 3 facing toward the rear of the vehicle. Further, the accommodation portion 5 extends continuously from the flat portion 4. The drive device 2 is accommodated and fixed in the accommodation portion 5.

Figure 3:
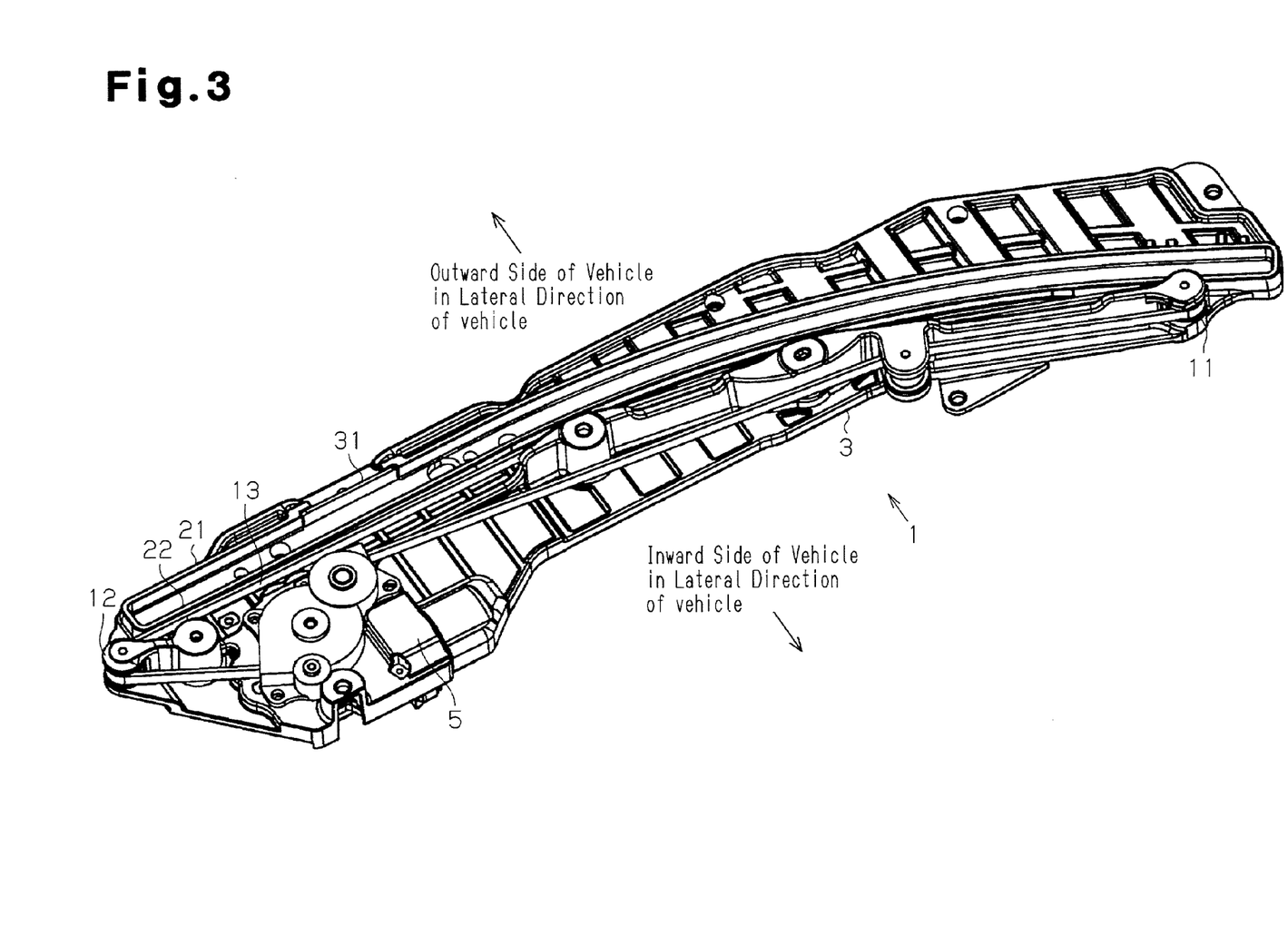
FIG. 3 is a perspective view showing the step unit of FIG. 1 from a lower side.
Figure 4:
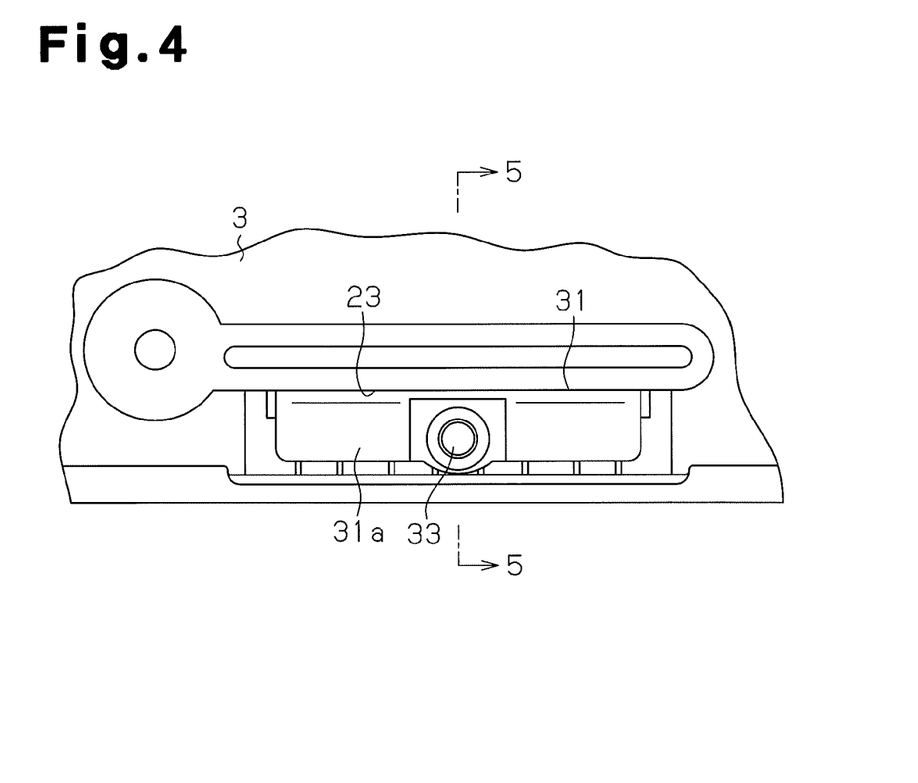
FIG. 4 is a partial plan view showing the step unit of FIG. 1.

Referring to FIG. 3, pulleys 11 and 12 are arranged on a lower surface of the step member 3 to support a belt 13, which is driven by the drive device 2. The belt 13 extends in the direction in which the sliding door 110 opens and closes.

Figure 6:
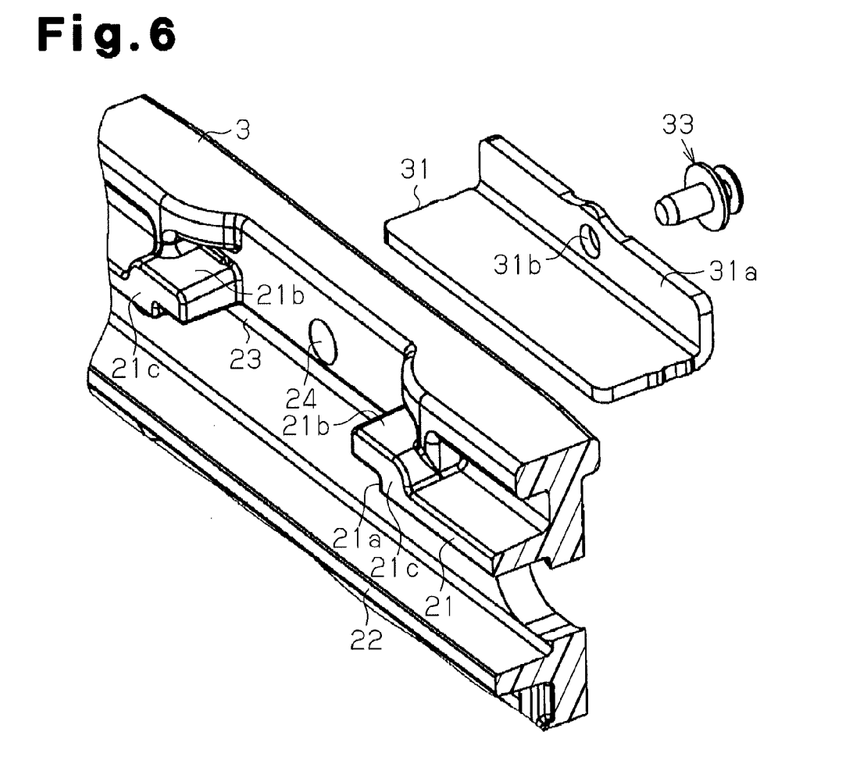
FIG. 6 is a partial exploded perspective view showing the step unit of FIG. 1 from a lower side.
Figure 7:
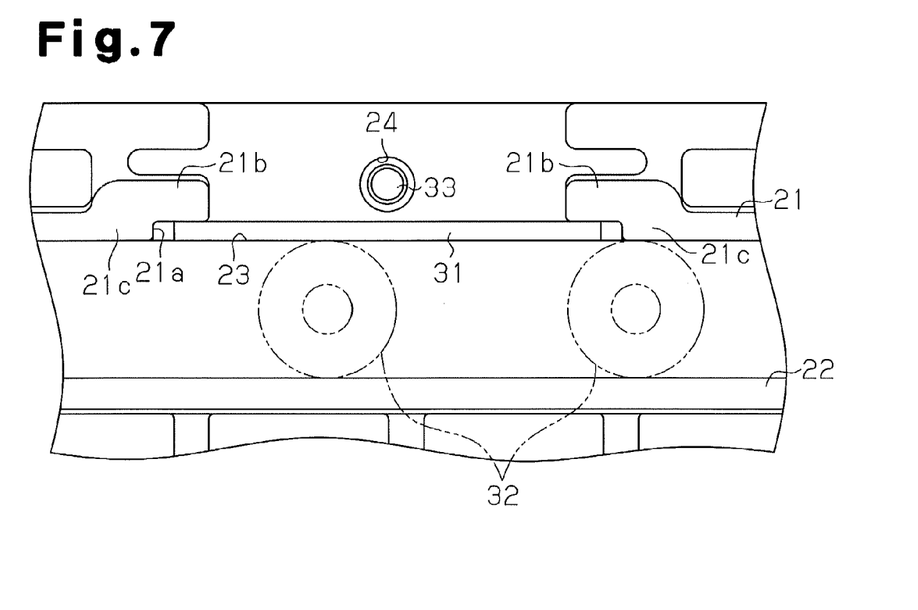
FIG. 7 is a partial bottom view showing the step unit of FIG. 1.

As shown in FIG. 3, first and second lower rails 21 and 22 are molded integrally with the lower surface of the step member 3. The lower rails 21 and 22 extend in the direction in which the sliding door 110 opens and closes (generally longitudinal direction of the vehicle). The ends of the first lower rail 21 are connected to the ends of the second lower rail 22. As shown in FIGS. 6 and 7, a cutout portion 21a is formed in one part of the first lower rail 21. A rail plate member 31 that continuously connects the lower rail 21 in the direction in which the sliding door 110 opens and closes is arranged in the cutout portion 21a. Rollers 32 (refer to FIG. 7) are arranged between the two lower rails 21 and 22 including the rail plate member 31. The rollers 32 are coupled to the sliding door 110 by brackets (not shown) or the like. Thus, the two lower rails 21 and 22 guide the rollers 32 and the sliding door 110 in the opening and closing direction of the sliding door 110. The rollers 32 of the present embodiment are also coupled to the belt 13 by brackets (not shown). The rotation of the belt 13 moves the rollers 32 guided along the lower rails 21 and 22 in the opening and closing directions of the sliding door 110.

More specifically, referring to FIGS. 6 and 7, an insertion hole 23 extends vertically through the step member 3 at a position corresponding to the cutout portion 21a. The step member 3 also includes two extended portions 21b. The extended portions 21b respectively extended from two opposing ends 21c of the lower rail 21, which define the cutout portion 21a. The extended portions 21b support the rail plate member 31 against load received by the rail plate member 31 from the rollers 32 (see FIG. 7). As shown in FIG. 7, the extended portions 21b extends from the corresponding ends 21c in the direction in which the rail plate member 31 receives load, that is, upward as viewed in FIG. 7 and outward relative to the vehicle in the lateral direction of the vehicle. Further, the extended portions 21b extend toward each other but are not continuous with each other so as to form a gap in between. The extended portions 21b are thicker than the lower rail 21 in the direction in which load is received (vertical direction as viewed in FIG. 7).

Figure 5:
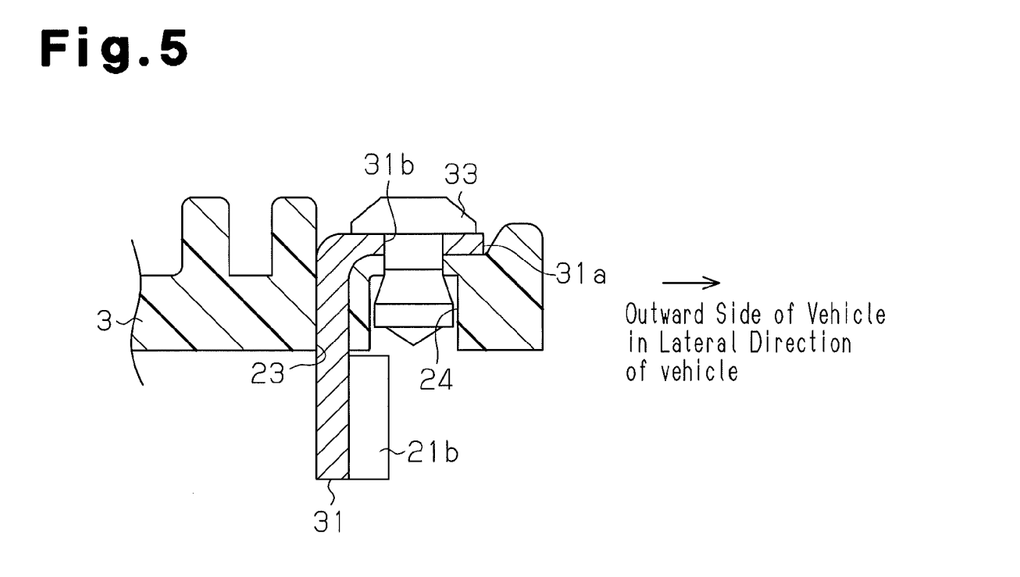
FIG. 5 is a cross-sectional view of the step unit taken along line 5-5 in FIG. 4.

As shown in FIGS. 5 to 7, the step member 3 also includes an engagement hole 24 extending through the vertical direction at a position located outward from the insertion hole 23 relative to the vehicle in the lateral direction.

As shown in FIG. 6, the rail plate member 31 is formed by machining a metal plate. The rail plate member 31 is inserted through the insertion hole 23 from the upper side of the step member 3. A resin clip 33, which serves as a fastening member, fixes (fastens) the rail plate member 31 to the step member 3. As shown in FIGS. 2, 5, and 6, the rail plate member 31 includes a bent portion 31a, which is arranged at the upper end in the coupled state and which extends in a direction orthogonal to the vertical direction, that is, toward an outer side of the vehicle in the lateral direction of the vehicle. The bent portion 31a includes a fastening hole 31b extending in the vertical direction, as shown in FIG. 6. The fastening hole 31b is aligned with the engagement hole 24 in the coupled state. The rail plate member 31 is inserted into the insertion hole 23 until the lower surface of the bent portion 31a contacts the upper surface of the step member 3. Then, the resin clip 33 is fitted into the fastening hole 31b and the engagement hole 24 to fix the rail plate member 31 to the step member 3. The resin clip 33 is formed from a resin material. In the present embodiment, the resin clip 33 has a structure similar to that generally used to couple a trim or the like to a vehicle. The resin clip 33 includes a base and a head. To fix the rail plate member 31 and the step member 3, the base is fitted to the fastening hole 31b and the engagement hole 24. Then, the head is fitted into the base. To release the rail plate member 31 from the step member 3, the head is first pulled out of the base. Then, the base is pulled out of the fastening hole 31b and the engagement hole 24. The resin clip 33 is schematically shown in FIGS. 4 to 7.

The operation of the step unit 1 will now be described.

In the structure described above, for example, when performing maintenance work, the resin clip 33 and the rail plate member 31 may be removed from the step member 3. This allows the rollers 32 to be inserted through the cutout portion 21a of the lower rail 21 into the space between the two lower rails 21 and 22 or be removed through the cutout portion 21a from between the two lower rails 21 and 22. In a state in which the step unit 1 is assembled, the drive device 2 is driven to rotate the belt 13. This moves the rollers 32 guided along the lower rails 21 and 22 and opens and closes the sliding door 110.

The above embodiment has the advantages described below.

(1) The step member 3 includes the insertion hole 23, which extends through the step member 3 in the vertical direction at a location corresponding to the cutout portion 21a formed in part of the lower rail 21. The rail plate member 31 is inserted through the insertion hole 23 from the upper side of the step member 3 and fixed by the resin clip 33 to the step member 3. This facilitates the assembly work compared to the prior art. Further, the resin clip 33 is used to fix the rail plate member 31. Thus, in comparison to when, for example, press-fitting and fixing a rail plate member to an insertion hole, the rail plate member 31 and the insertion hole 23 do not need to be manufactured with high accuracy. When press-fitting and fixing the rail plate member into the insertion hole, the rail plate member and insertion hole should be formed with high accuracy. Otherwise, dimension variations may result in the rail plate member being loose or a large force being necessary for the press-fitting. In contrast, the step unit 1 of the present embodiment does not have such a drawback and is thus advantageous.

Further, when press-fitting and fixing the rail plate member into the insertion hole, the rail plate member, which is press-fitted and fixed, may have to be removed, for example, to perform maintenance. In such a case, the desired press-fitting force may not be obtained when press-fitting the rail plate member again after the maintenance work is completed. This may result in the rail plate becoming loose in the insertion hole. In contrast, the step unit 1 of the present embodiment does not have such a drawback and is thus advantageous.

The step member 3 includes the extended portions 21*b* respectively extending from the two ends 21*c* of the lower rail 21 to support the rail plate member 31 against load that is received by the rail plate member 31 from the rollers 32. This prevents the rail plate member 31 from being deformed by the load received from the roller 32. Further, the extended portions 21*b* prevent a force corresponding to the load of the rollers 32 from being applied to the resin clip 33. Thus, the resin clip 33 does not require high strength. As a result, the resin clip 33 does not have to be formed from a metal and may be formed from a resin material like in the present embodiment. Moreover, the extended portions 21*b* extend from the ends 21*c* of the lower rail 21. This increases the rigidity of the ends 21*b*. Thus, there is no need for the rail plate member 31 to include a structure that reinforces the ends 21*c*. Consequently, the rail plate member 31 has a simple shape and may be formed from a single plate (metal plate) like in the present embodiment.

Furthermore, when part of the rail plate member is bulged outward to be flush with the inner surface of the lower rail (surface that contacts rollers) as in the prior art, a corner of the bulged portion would be rounded and a step that affects the rollers would be easily formed between the end of the lower rail and the rail plate member. In contrast, the rail plate member 31 of the present embodiment does not have to be molded to form such a bulging portion. This easily eliminates such a step and contributes to smooth movement of the roller 32 and the sliding door 110.

A step member is generally formed processing a sheet metal of metal. However, the step member 3 of the present embodiment is molded from a resin. This increases the degree of freedom in the shape of the step member 3, and the extended portions 21*b* and the like can easily be molded integrally with the step member 3.

(2) The resin clip 33 is formed from a resin material. This lower costs and decreases weight compared to when using a metal bolt or the like that is formed from a metal material. For example, when a metal bolt is used in lieu of the resin clip 33, to avoid problems resulting from the difference in coefficient of thermal expansion, a metal member, such as a nut for engagement with the metal bolt, must be insert molded in the step member 3. In contrast, the use of the resin clip 33, which is formed from a resin material, like in the present embodiment decreases the difference in the coefficient of thermal expansion when the resin clip 33 is directly engaged with the step member 3, which is formed from a resin material. This eliminates the need for a metal member such as a nut.

(3) The rail plate member 31 includes the bent portion 31*a*, which is arranged at the upper end and extends in a direction orthogonal to the vertical direction. Thus, for example, the bent portion 31*a* prevents the rail plate member 31 from falling from the step member 3 (insertion hole 23). Further, in a state in which the rail plate member 31 is inserted in the insertion hole 23 and the resin clip 33 removed from the rail plate member 31, a jig can be used to lift the bent portion 31*a* from its lower surface to easily remove the rail plate member 31. Further, in the present embodiment, the bent portion 31*a* extended outward relative to the vehicle in the lateral direction of the vehicle. Thus, one may use a jig to lift the bent portion 31*a* from the outer side of the vehicle. Thus, removal of the rail plate member 31 is facilitated compared to when working from the inner side of the vehicle.

(4) The resin clip 33 is coupled from the upper side to fasten the bent portion 31*a* between the resin clip 33 and the step member 3. More specifically, the rail plate member 31 is inserted through the insertion hole 23 from above the step member 3. Then, the resin clip 33 is also coupled from above. Thus, the resin clip 33 is quickly and easily coupled compared to when coupled from other directions.

(5) The extended portions 21*b*, which are formed integrally with the step member 3, extend from the corresponding ends 21*c* toward each other along a direction in which the rail plate member 31 receives a load from the rollers 32 (upward direction as viewed in FIG. 7), and the two extended portions extend toward each other. In such a structure, the extended portions 21*b* do not obstruct the arrangement of the rollers 32 through the cutout portion 21*a* between the two lower rails 21 and 22. In addition, the two opposite ends of the rail plate member 31 are supported by the extended portions 21*b*. This increases the rigidity of the rail plate member 31 in the direction in which the rail plate member 31 receives load (input) from the rollers 32 compared to a structure in which only one of the two ends of the rail plate member is supported. Further, the rigidity increases at the two ends 21*c* of the lower rail 21. In this structure, the space between the extended portions 21*b* can be used to easily lift the rail plate member 31 manually or with a jig. Thus, the rail plate member 31 can be easily removed.

(6) The extended portions 21*b* are thicker than the lower rail 21 in the direction the rail plate member 31 receives a load (vertical direction in FIG. 7). This securely supports the rail plate member 31 while obtaining the advantage of (5).

It should be apparent to those skilled in the art that the present invention may be embodied in many other specific forms without departing from the spirit or scope of the invention. Particularly, it should be understood that the present invention may be embodied in the following forms.

In the embodiment described above, the fastening member is the resin clip 33, which is formed from a resin material, but not limited in such a manner and may be changed to other fastening members formed from a resin material or may be changed to a fastening member formed from a metal material.

Figure 8:
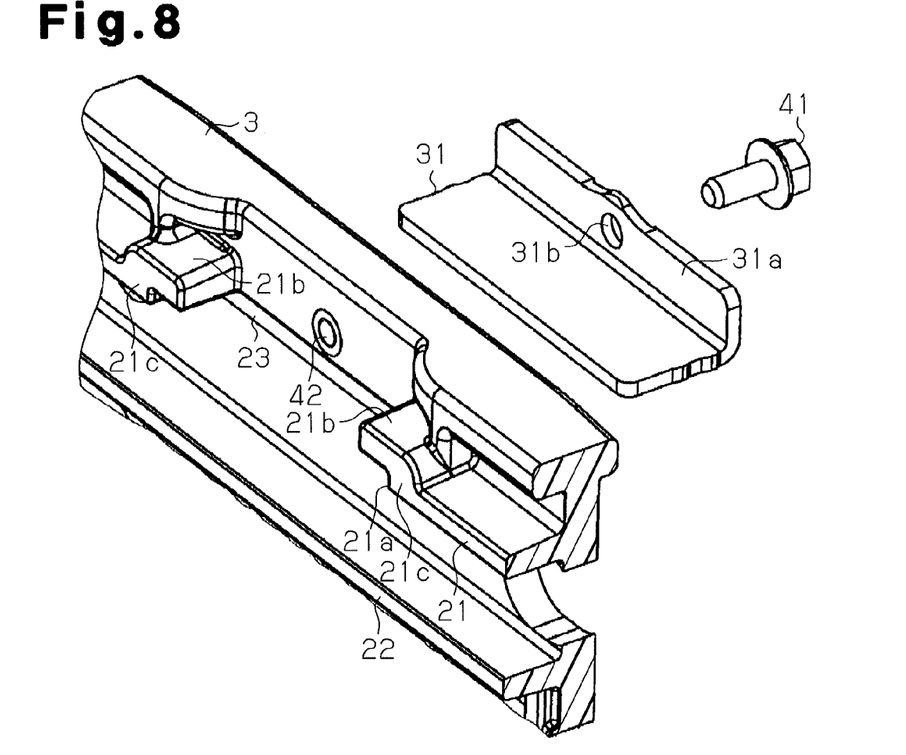
FIG. 8 is a partial exploded perspective view showing another example of a step unit from a lower side.

The resin clip 33 may be modified as shown in FIG. 8. In this example, the resin clip 33 of the embodiment described above is changed to a metal bolt 41. A metal threaded element 42, to which the metal bolt 41 can be fastened, is insert molded in the step member 3 at a position corresponding to where the engagement hole 24 of the embodiment is formed. This prevents the metal bolt 41 from becoming loose due to the difference in the coefficient of thermal expansion of the metal bolt 41 and the step member 3 when molding a threaded element in the step member 3.

In the embodiment described above, the resin clip 33 is coupled from the upper side so as to fasten the bent portion 31*a* between the resin clip 33 and the step member 3. However, it is only necessary that the fixed rail plate member be inserted through the insertion hole from the upper side of the step member. For example, a fastening member may be coupled from other directions in lieu of the resin clip 33.

Figure 9:
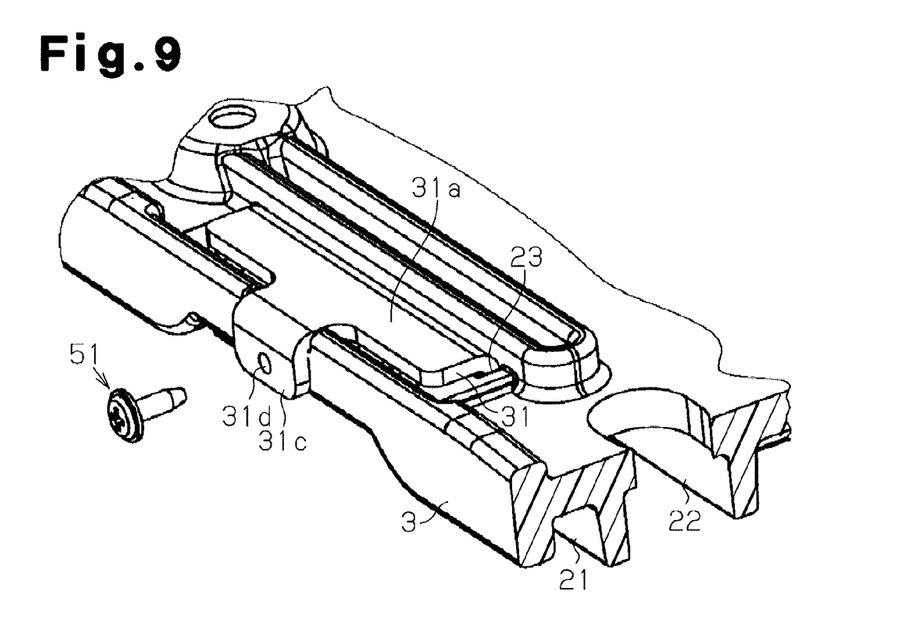
FIG. 9 is a partial exploded perspective view showing another example of a step unit from an upper side.

For example, the resin clip 33 may be modified as shown in FIG. 9. In this example, a downward extending portion 31*c* is formed at the distal end of the bent portion 31*a*, which is similar to that of the embodiment described above. In this example, however, the fastening hole 31b is not formed in the bent portion 31a. Instead, a fastening hole 31d is formed in the downward extending portion 31c. An engagement hole or bore (not shown) that is in communication with the fastening hole 31d is formed in the step member 3 in a surface facing outward relative to the vehicle. A resin clip 51, which serves as a fastening member in this example, is coupled from the outer side of the vehicle to fasten the downward extending portion 31c between the resin clip 51 and the outer side surface of the step member 3. That is, the resin clip 51 is fitted to the fastening hole 31d and the engagement hole (or bore).

In this structure, the bent portion 31a and the downward extending portion 31c are hooked and prevent the rail plate member 31 from falling out of the step member 3 (or insertion hole 23). The resin clip 51 is assembled from the outer side of the vehicle. This facilitates the coupling of the resin clip 51 compared to when coupled from the lower side.

In the embodiment described above, the rail plate member 31 includes the bent portion 31a, which is arranged at the upper end and extends in a direction orthogonal to the vertical direction. However, the bent portion 31a may be eliminated. In such a case, each extended portion 12b of the step member 3 may be formed integrally with a bottom wall preventing separation of a rail plate member that does not include the bent portion 31a. Further, in such a case, the fastening member fastens portions other than the bent portion 31a. For example, fastening members may extend through the extended portions 21b from the outer side of the vehicle to fix the rail plate member.

In the embodiment described above, the two extended portions 21b are extended from the two corresponding ends 21c of the lower rail 21 but not limited in such a manner. For example, there can be just one extended portion 21b that is extended from one of the two ends 21c.

In the embodiment described above, the rail plate member 31 is formed by processing a metal plate but not limited in such a manner. For example, the rail plate member 31 may be molded from a resin material.

In the embodiment described above, the extended portions 21b is thicker than the lower rail 21 in the direction in which load is received (vertical direction in FIG. 7) but not limited in such a manner. For example, the extended portions 21b may have the same thickness as the lower rail 21.

In the embodiment described above, the step unit 1 includes the drive device (motor unit) 2 to open and close the sliding door 110 of the vehicle but not limited in such a manner. For example, the drive device 2 may be eliminated. In such a case, the accommodation portion 5 can be eliminated from the step member. Further, the pulleys 11 and 12 and the belt 13 also become unnecessary.

The present examples and embodiments are to be considered as illustrative and not restrictive, and the invention is not to be limited to the details given herein, but may be modified within the scope and equivalence of the appended claims.

The invention claimed is:

1. A step unit that guides a sliding door of a vehicle along a direction in which the sliding door opens and closes, the step unit comprising:
 a step member formed from a resin material arranged in a vehicle body adjacent to the sliding door, wherein the step member includes a lower surface and first and second lower rails, which are arranged on the lower surface and extend along the direction in which the sliding door opens and closes, the first and second lower rails hold and guide a roller therebetween, the roller is coupled to the sliding door, and the first lower rail includes two ends facing toward each other to form a cutout portion between the two ends; and
 a rail plate member arranged in the cutout portion and continuously connecting the first lower rail along the opening and closing direction;
 wherein the step member includes an insertion hole, which extends through the step member in a vertical direction of the vehicle body at a location corresponding to the cutout portion, and an extended portion, which extends from at least one of the two ends to support the rail plate member against a load received by the rail plate member from the roller;
 the rail plate member is inserted through the insertion hole from above the step member and fixed by a fastening member to the step member; and
 the rail plate member includes a bent portion, which is arranged at an upper end of the plate member and extends in a direction orthogonal to the vertical direction of the vehicle body.

2. A step unit that guides a sliding door of a vehicle along a direction in which the sliding door opens and closes, the step unit comprising:
 a step member formed from a resin material arranged in a vehicle body adjacent to the sliding door, wherein the step member includes a lower surface and first and second lower rails, which are arranged on the lower surface and extend along the direction in which the sliding door opens and closes, the first and second lower rails hold and guide a roller therebetween, the roller is coupled to the sliding door, and the first lower rail includes two ends facing toward each other to form a cutout portion between the two ends; and
 a rail plate member arranged in the cutout portion and continuously connecting the first lower rail along the opening and closing direction;
 wherein the step member includes an insertion hole, which extends through the step member in a vertical direction of the vehicle body at a location corresponding to the cutout portion, and an extended portion, which extends from at least one of the two ends to support the rail plate member against a load received by the rail plate member from the roller;
 the rail plate member is inserted through the insertion hole from above the step member and fixed by a fastening member to the step member; and
 the extended portion is one of two extended portions, the two extended portions respectively extend from the two ends in a direction in which a load is received by the rail plate member, and the two extended portions extend toward each other.

3. A step unit that guides a sliding door of a vehicle along a direction in which the sliding door opens and closes, the step unit comprising:
 a step member formed from a resin material arranged in a vehicle body adjacent to the sliding door, wherein the step member includes a lower surface and first and second lower rails, which are arranged on the lower surface and extend along the direction in which the sliding door opens and closes, the first and second lower rails hold and guide a roller therebetween, the roller is coupled to the sliding door, and the first lower rail includes two ends facing toward each other to form a cutout portion between the two ends; and
 a rail plate member arranged in the cutout portion and continuously connecting the first lower rail along the opening and closing direction;

wherein the step member includes an insertion hole, which extends through the step member in a vertical direction of the vehicle body at a location corresponding to the cutout portion, and an extended portion, which extends from at least one of the two ends to support the rail plate member against a load received by the rail plate member from the roller;

the rail plate member is inserted through the insertion hole from above the step member and fixed by a fastening member to the step member; and the fastening member is formed from a resin material.

4. The step unit according to claim 1, wherein the extended portion is one of two extended portions, the two extended portions respectively extend from the two ends in a direction in which a load is received by the rail plate member, and the two extended portions extend toward each other.

5. The step unit according to claim 4, wherein the two extended portions are thicker than the first lower rail in the direction of the load.

6. The step unit according to claim 1, wherein the rail plate member includes a bent portion, which is arranged at an upper end of the plate member and extends in a direction orthogonal to the vertical direction of the vehicle body.

7. The step unit according to claim 6, wherein the fastening member is coupled to the step member from above to fasten the bent portion between the fastening member and an upper surface of the step member.

8. The step unit according to claim 6, wherein the bent portion extends toward an outer side of the vehicle in a lateral direction of the vehicle.

9. The step unit according to claim 6, wherein the step member includes an engagement hole extending through the step member in the vertical direction of the vehicle body at a location corresponding to the cutout portion, the bent portion includes a fastening hole extending through the bent portion in the vertical direction of the vehicle body and aligned with the engagement hole when the rail plate member is coupled to the step member, and the rail plate member is fixed to the step member by the fastening member fitted to the fastening hole and the engagement hole in a state in which the rail plate member is inserted into the insertion hole until a lower surface of the bent portion comes into contact with an upper surface of the step member.

10. The step unit according to claim 6, wherein the bent portion includes a distal end from which a downward extending portion extends, and the fastening member is coupled from an outer side of the vehicle to fasten the downward extending portion between the fastening member and a side surface of the step member facing outward relative to the vehicle.

* * * * *